United States Patent
Zhang et al.

(10) Patent No.: US 12,045,256 B2
(45) Date of Patent: Jul. 23, 2024

(54) TRACING DATA IN COMPLEX REPLICATION SYSTEM

(71) Applicant: International Business Machines Corporation, Armonk, NY (US)

(72) Inventors: He Fang Zhang, Beijing (CN); Yan Liu, Beijing (CN); Meng Zhao, Beijing (CN); Hai Long Shi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 17/893,317

(22) Filed: Aug. 23, 2022

(65) Prior Publication Data

US 2024/0070167 A1   Feb. 29, 2024

(51) Int. Cl.
 *G06F 16/27* (2019.01)
 *G06F 16/23* (2019.01)

(52) U.S. Cl.
 CPC ........ *G06F 16/273* (2019.01); *G06F 16/2365* (2019.01)

(58) Field of Classification Search
 CPC .... G06F 16/273; G06F 16/2365; G06F 3/065; G06F 16/27; G06F 11/2074
 USPC .......... 707/610, 613, 615, 620, 626
 See application file for complete search history.

(56) References Cited

U.S. PATENT DOCUMENTS

| | | | |
|---|---|---|---|
| 8,572,031 B2 | 10/2013 | Merriman et al. | |
| 9,473,532 B2 | 10/2016 | Pearl et al. | |
| 11,321,006 B1 | 5/2022 | Grunwald et al. | |
| 2002/0032742 A1* | 3/2002 | Anderson | H04L 51/224 709/206 |
| 2008/0034011 A1* | 2/2008 | Cisler | G06F 16/4387 707/999.202 |
| 2010/0049753 A1 | 2/2010 | Prahlad et al. | |
| 2010/0268991 A1* | 10/2010 | Birch | G06F 11/2215 709/227 |
| 2011/0252124 A1 | 10/2011 | Bonner et al. | |
| 2011/0320416 A1* | 12/2011 | Kapoor | G06F 16/273 707/E17.005 |
| 2012/0166390 A1 | 6/2012 | Merriman et al. | |
| 2014/0026182 A1* | 1/2014 | Pearl | H04L 63/20 726/1 |

(Continued)

FOREIGN PATENT DOCUMENTS

CN    103294752 A    9/2013

OTHER PUBLICATIONS

International Search Report and Written Opinion issued in the International Application No. PCT/CN2023/095027, mailed on Jul. 24, 2023.

(Continued)

*Primary Examiner* — Phong H Nguyen

(57) ABSTRACT

An example operation may include one or more of receiving a message from an agent installed at a data replication server, the message comprising a status identifier of a checksum validation of a data replication operation, identifying a latency value associated with the data replication server, determining whether a data loss has occurred based on the status identifier of the checksum validation and the latency value, and in response to a determination that the data loss has occurred, transmitting a notification of the data loss to a computing system associated with the data replication server.

16 Claims, 14 Drawing Sheets

(56) References Cited

U.S. PATENT DOCUMENTS

| | | |
|---|---|---|
| 2014/0229937 A1* | 8/2014 | Holder .................. G06F 9/5022 |
| | | 718/1 |
| 2016/0048560 A1* | 2/2016 | Khandelwal ........ G06F 16/2264 |
| | | 707/634 |
| 2016/0234296 A1 | 8/2016 | Zucca |
| 2017/0193004 A1 | 7/2017 | Karuppusamy et al. |
| 2018/0143774 A1 | 5/2018 | Carson et al. |
| 2018/0260583 A1* | 9/2018 | Doerner .................. H04L 69/40 |
| 2020/0210947 A1* | 7/2020 | Devarakonda ... G06Q 10/06312 |
| 2020/0356462 A1* | 11/2020 | Anand ................ G06F 11/3495 |

OTHER PUBLICATIONS

Unknown, Use Alerts for Replication Agent Events, Published in Microsoft, Dec. 15, 2020.

Unknown, Validate Replicated Data, Published in Microsoft, Feb. 2021.

Zhuang et al., Capacity Planning and Headroom Analysis for Taming Database Replication Latency, published in ICPE '15: Proceedings of the 6th ACM/SPEC International Conference on Performance Engineering, Jan. 2015.

* cited by examiner

200

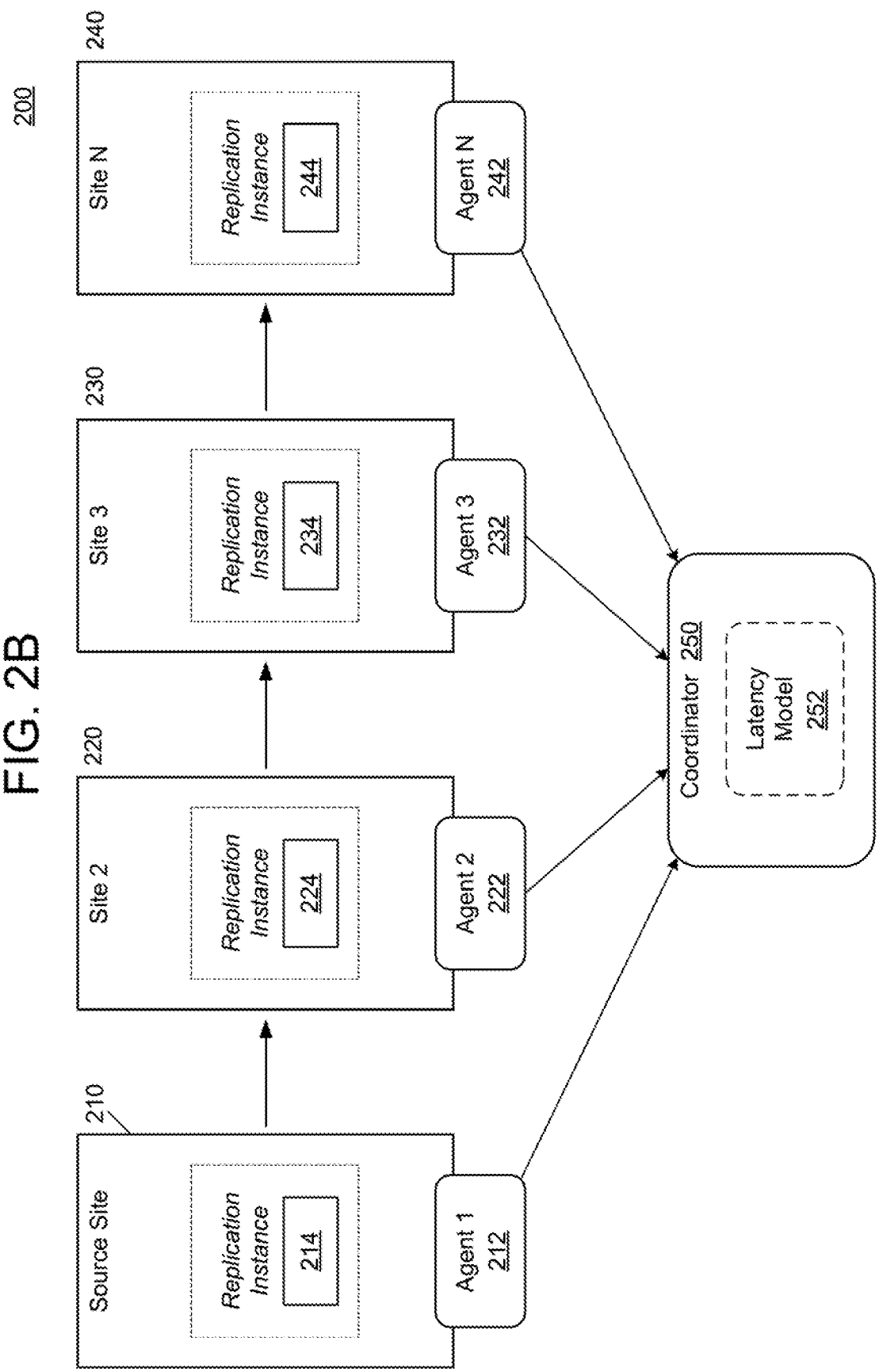

370

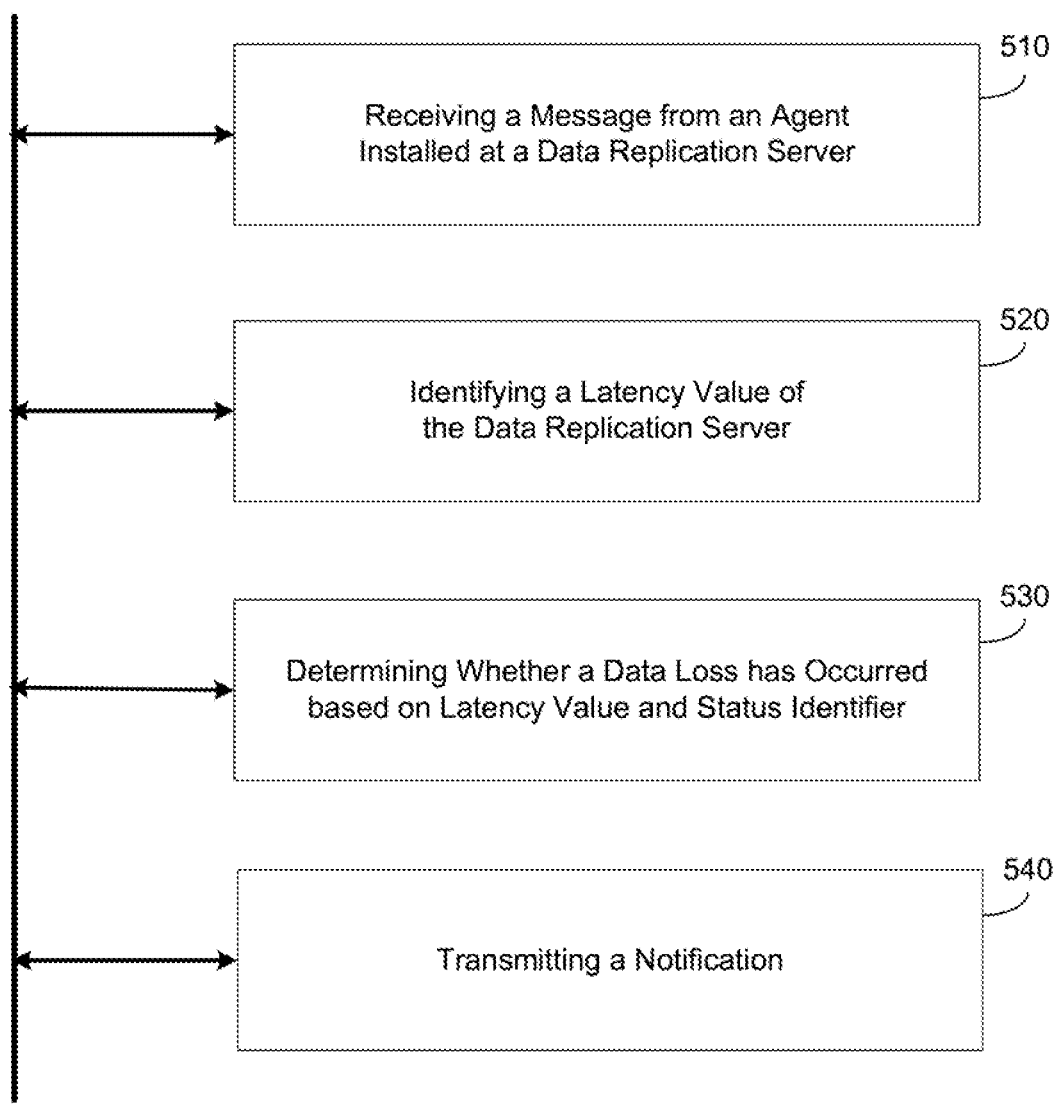

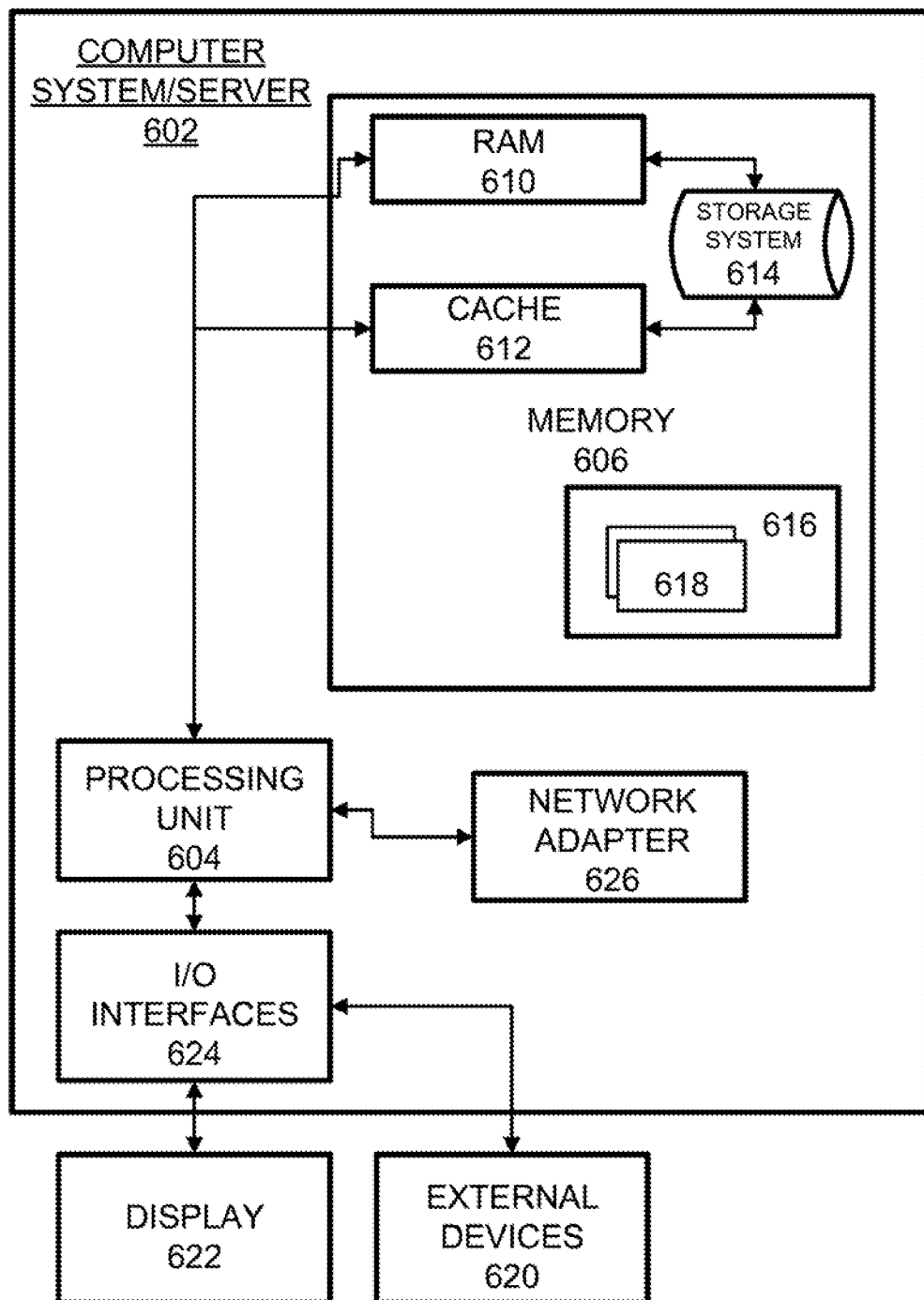

TRACING DATA IN COMPLEX REPLICATION SYSTEM

BACKGROUND

In a complex replication environment, multiple replication sites (nodes) may be connected to one another in a distributed network topology. Within the network, each replication site may include a replication server (e.g., a canonical log server, etc.) that runs a workflow and replicates the workflow to one or more other sites in the network. For example, data stored at one server may be replicated (transferred) to other servers within the distributed network as part of a remote backup storage operation, etc. In many cases, the data may be transferred using SQL replication, or the like.

In some cases, data can be lost during a replication operation. For example, small portions of rows of data within a table, etc., may be missing when the table arrives at its destination in the replication operation. The missing data can be very difficult to detect, especially in a complex environment where the servers must be available continuously and in real-time. Furthermore, there is usually no error reported when data is lost. Accordingly, what is needed is a better mechanism for tracing data during a data replication operation and notifying when the data is lost.

SUMMARY

One example embodiment provides an apparatus that includes a network interface configured to receive a message from an agent installed at a data replication server, where the message may include a status identifier of a checksum validation of a data replication operation, and a processor configured to one or more of identify a latency value associated with the data replication server, determine whether a data loss has occurred based on the status identifier of the checksum validation and the latency value, and in response to a determination that the data loss has occurred, transmit a notification of the data loss to a computing system associated with the data replication server via the network interface.

Another example embodiment provides a method that includes one or more of receiving a message from an agent installed at a data replication server, the message comprising a status identifier of a checksum validation of a data replication operation, identifying a latency value associated with the data replication server, determining whether a data loss has occurred based on the status identifier of the checksum validation and the latency value, and in response to a determination that the data loss has occurred, transmitting a notification of the data loss to a computing system associated with the data replication server.

A further example embodiment provides a computer-readable medium comprising instructions, that when read by a processor, cause the processor to perform one or more of receiving a message from an agent installed at a data replication server, the message comprising a status identifier of a checksum validation of a data replication operation, identifying a latency value associated with the data replication server, determining whether a data loss has occurred based on the status identifier of the checksum validation and the latency value, and in response to a determination that the data loss has occurred, transmitting a notification of the data loss to a computing system associated with the data replication server.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2B is a diagram illustrating a system for identifying data loss in a complex replication system according to an example embodiment.

FIG. 5 is a diagram illustrating a method of determining whether a data loss has occurred according to an example embodiment.

FIG. 6 is a diagram illustrating an example of a computing system that supports one or more of the example embodiments.

DETAILED DESCRIPTION

Figure 1:
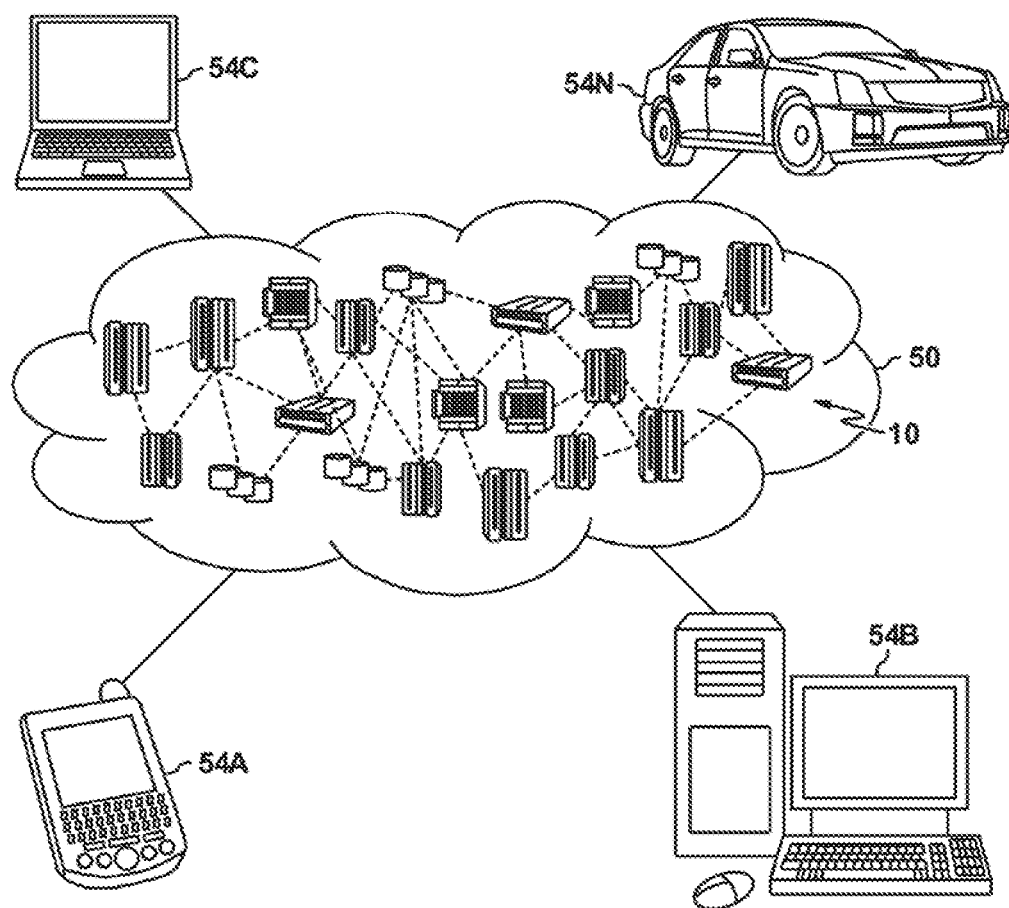
FIG. 1 is a diagram illustrating a cloud computing environment that interacts with various devices according to an example embodiment.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Currently, there does not exist a product that can adequately monitor a data replication system and detect a data loss in a replication operation in an efficient manner. Instead, a traditional strategy is to add diagnostic code into one or more the components, rebuild the product, stop the program and redeploy the product into customer's production system. The diagnostic code can catch detailed information that can be analyzed for data loss. Some of the drawbacks of this process include taking the server down (and possibly causing an outage to a customer or multiple customers. In addition, the code changes can cause unintentional changes to the operation and maintenance of the product. Furthermore, the problem may not be easy to reproduce because some issues (e.g., random issues, etc.) are not predictable. Likewise, the computing resources necessary to debug the code are also unpredictable which can result in additional problems for the host.

The example embodiments are directed to a tracking system for monitoring and tracking data loss within a complex data replication network. The network may include a distribute network of replication sites. Each replication site may include one or more servers with replication software installed therein. The replication software may be configured to receive and transfer data to other servers in the network and to synchronize the servers. For example, a source server may desire to back-up a copy of its data, applications, etc. Here, the source server may select a destination server for storing the backup. The destination server may be multiple hops (sites) away from the source server. The replication network may form a path of servers/sites therein for transferring the data to be backed-up from the source server to the destination server. Furthermore, the replication software may ensure and verify that a synchronized copy of the data from the source server is stored at the destination server.

The tracking system may include agents which are installed at each server (site) and a central coordinator configured to exchange messages with the agents and determine whether data has been lost during a replication operation. As an example, an agent may be a device, key, box, etc., that physically plugs into the server (e.g., via USB, LAN cable, etc.) As another example, the agent may be a software program installed within the server without the need for a physical device being plugged in. The pluggable device could be beneficial because it is easy to maintain and a user could simply unplug it when no longer needed instead of uninstalling it. Also, it is easy to plan dedicated resources (e.g., processor, memory etc.) for the agent since the hardware is included therein.

The coordinator may be installed or otherwise operating on a host platform such as a cloud platform, an on-premises server, or the like. The coordinator may be referred to herein as an advising system or a broker. The coordinator communicates with the agents using status check messages which provide the coordinator with insight on the data replication process. For example, a source site may transfer/backup data to a target site (destination site) via one or more intermediate sites. In this example, the source site may create a checksum or multiple checksums based on the data being transferred (e.g., checksums of one or more replication transaction within the data being transferred, etc.) and add the checksum(s) to a data replication message that includes the data being transferred. An intermediate server may receive the data replication message, verify the checksum(s), and report the validation results to the coordinator. In response, the coordinator may determine whether or not data loss has occurred and whether additional actions should be taken. The coordinator can also request re-sending of transaction content between the servers, if necessary.

The messages exchanged between agents and the coordinator include status indicators (checksum status indicators) which provide the results of a checksum validation process performed by an agent. For example, the message may include an identifier which indicates the checksum validation was a match (successful) or that the checksum validation did not result in a match (suspicious). The message may also include an identifier of an agent that sent the message, one or more transaction identifiers of one or more transactions used to create one or more checksums, respectively, and validation statuses of the one or more checksums. The exchanged messages may also include control messages used for administration or maintenance such as heartbeat messages, revalidation requests, and the like.

According to various embodiments, the messages exchanged between agents themselves and between the agents and the coordinator are different from the messages exchanged by the replication servers because they include checksum validations and identifiers of transactions that were used to create the checksums. Meanwhile, messages between replication servers typically includes only application/user data without any validation data for data loss. Thus, the agents and the coordinator can provide a benefit to a traditional data replication network by incorporating data loss detection capabilities and real-time notification ability into the data replication network which can reduce downtime, conserver resources, and ensure efficient operation of the data replication process.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Examples of cloud computing characteristics that may be associated with the example embodiments include the following.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Examples of service models that may be associated with the example embodiments include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models that may be associated with the example embodiments include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2A:
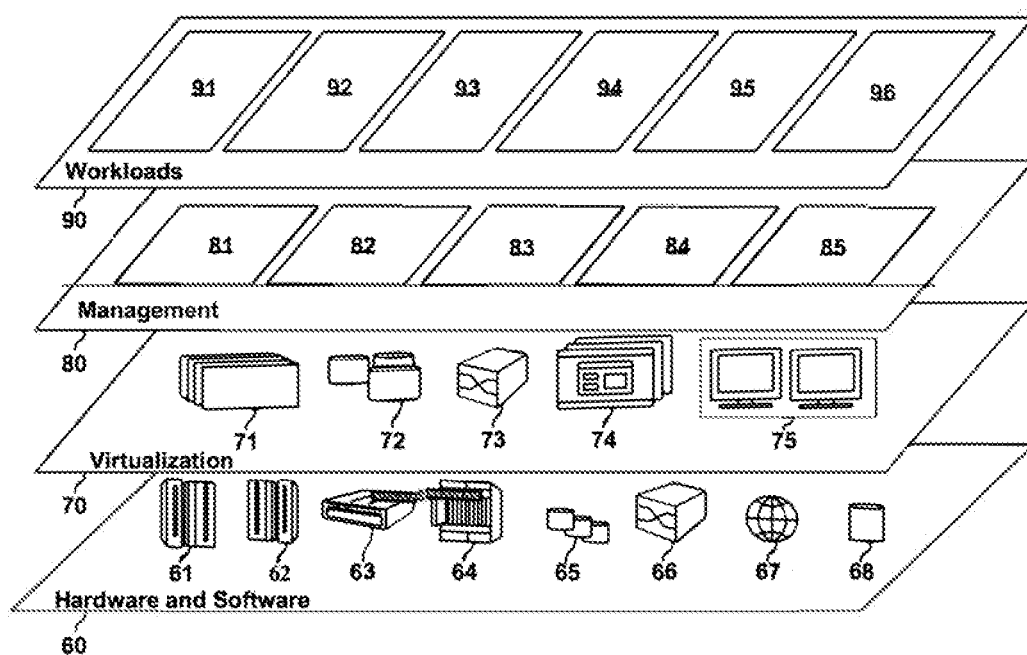
FIG. 2A is a diagram illustrating abstraction model layers of a cloud computing environment according to an example embodiment.

Referring now to FIG. 2A, a set of functional abstraction layers provided by cloud computing environment 50 FIG. 1) is shown. It should be understood in advance that the components, layers, and functions shown in FIG. 2A are intended to be illustrative only and embodiments of the invention are not limited thereto. As depicted, the following layers and corresponding functions are provided: Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and replication data loss detection 96.

FIG. 2B illustrates an example of a process 200 corresponding to the replication data loss detection 96 in FIG. 2A, in accordance with example embodiments. The process 200 may be executed by a system that includes a plurality of agents 212, 222, 232, and 242 which are installed at a plurality of sites 210, 220, 230, and 240, respectively, of a replication network. Here, each of the sites 210-240 may include a replication instance 214, 224, 234, and 244, which handles the replication process including the transfer of data between the different sites 210-240. As an example, the agents 212, 222, 232, and 242 may include software programs installed within data servers at the respective sites. As another example, the agents 212, 222, 232, and 242 may be hardware devices such as a device, a box, or the like, which can be physically plugged into the data servers. Each of the replication instances may include attributes of the replication operation including a number of rows per commit, identifiers of the data to be written, identifiers of the data to be deleted, identifiers of the data to be updated, and the like.

The system shown in FIG. 2B also includes a coordinator 250 which is installed in a cloud platform in this example. The cloud platform is located separately from the sites 210, 220, 230, and 240, although this is not a requirement. It should be appreciated that the coordinator 250 may be incorporated into an on-premises server, a data server at a replication site, and the like. The coordinator 250 includes a latency model 252. The latency model 252 may include a machine model or models that are trained to analyze a log of replication history of a data server and determine respective latency values for each of the agents 212, 222, 232, and 242, which are installed at each of the sites 210, 220, 230, and 240. The latency values represent a duration (e.g., 300 seconds, 1000 seconds, etc.) for each of the agents.

If data is missing from a transfer between two servers, but the latency value for the agent installed at the transmitting server is not exceeded yet, the coordinator 250 may request that the transmitting server re-send the missing data. As another example, the coordinator 250 may request the re-send even if the latency value for the respective agent is exceeded.

FIGS. 3A-3E provide various examples of additional features that may be used in association with the cloud computing environment described herein. These examples should be considered as additional extensions or additional examples of the embodiments described herein.

Figure 3A:
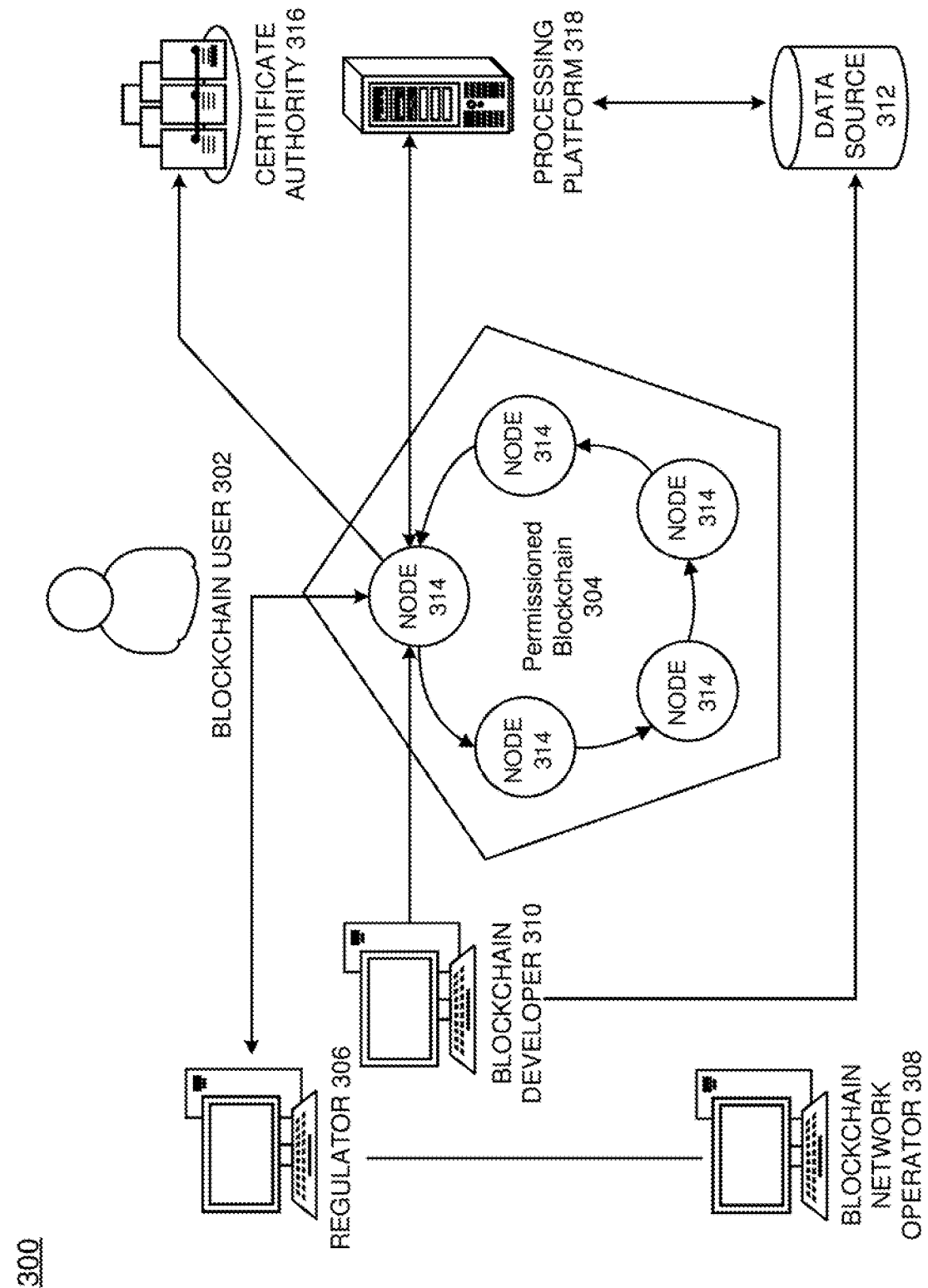
FIGS. 3A-3C are diagrams illustrating examples of a permissioned network according to example embodiments.

FIG. 3A illustrates an example of a permissioned blockchain network 300, which features a distributed, decentralized peer-to-peer architecture. The blockchain network may interact with the cloud computing environment 50, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
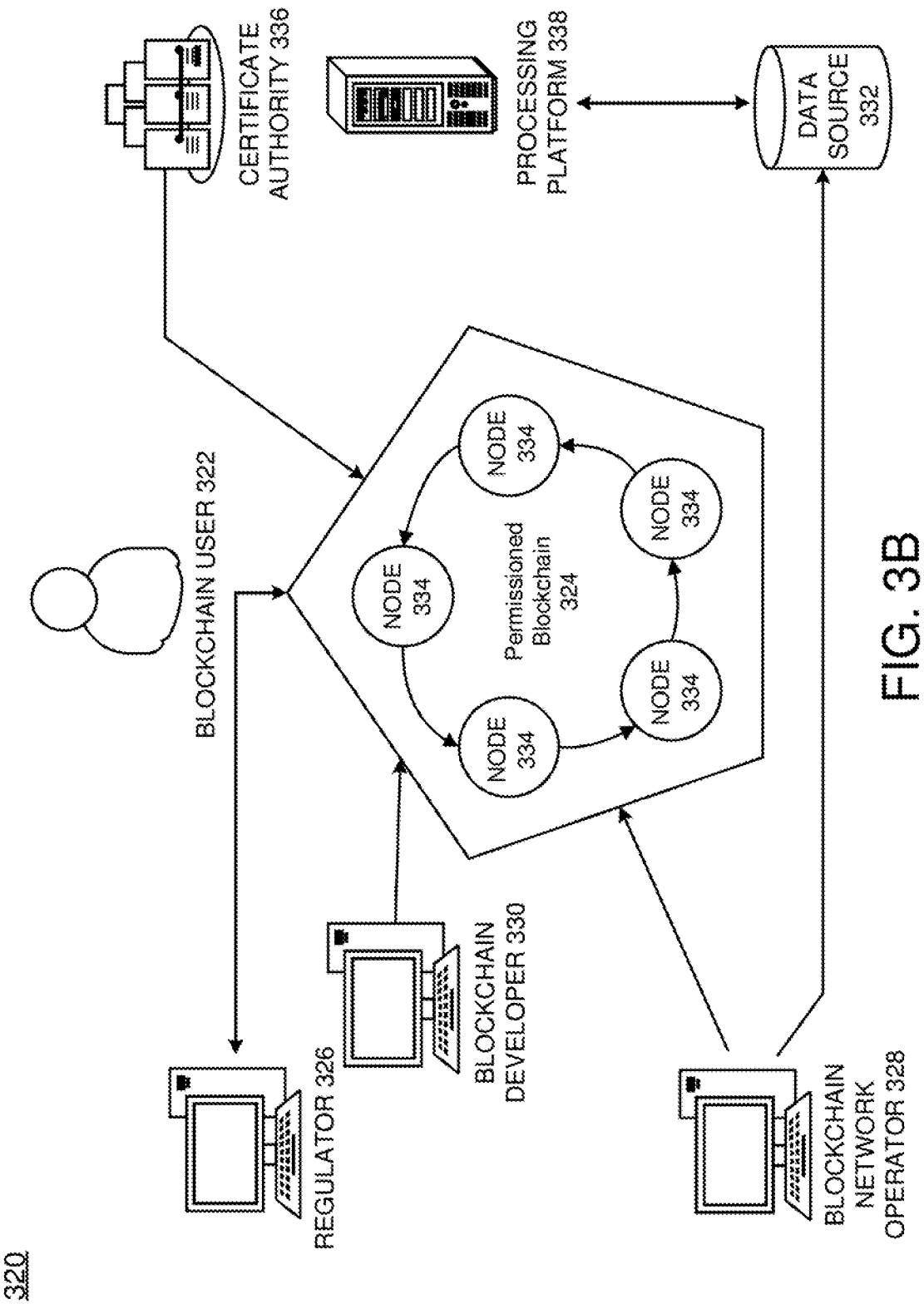

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
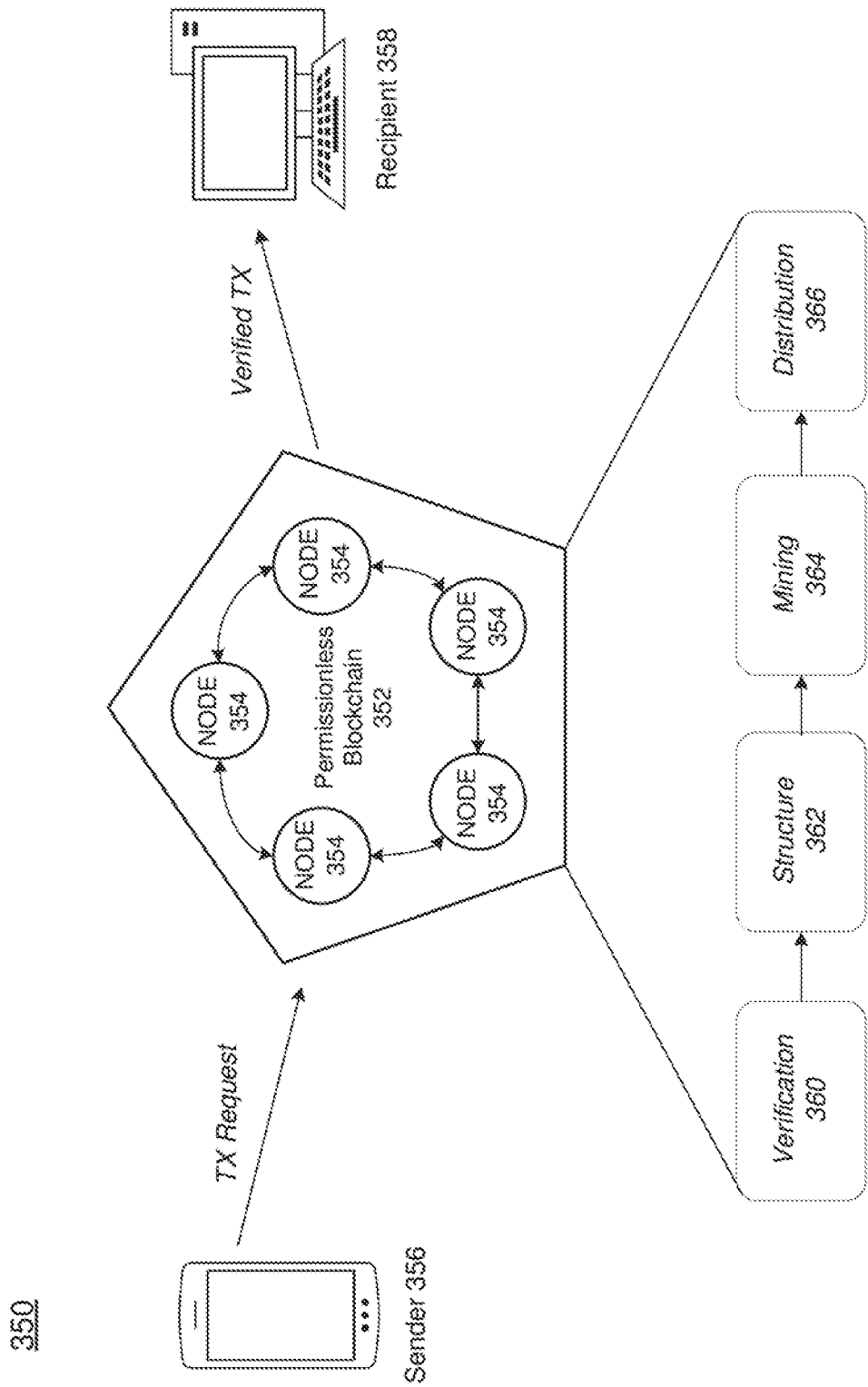

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3D:
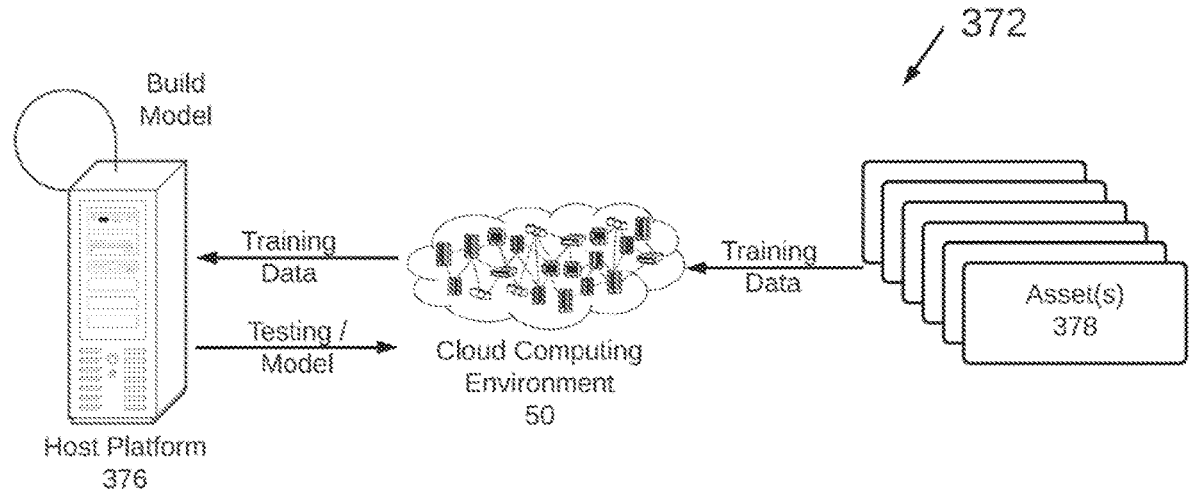
FIG. 3D is a diagram illustrating machine learning process via a cloud computing platform according to an example embodiment.
Figure 3D:
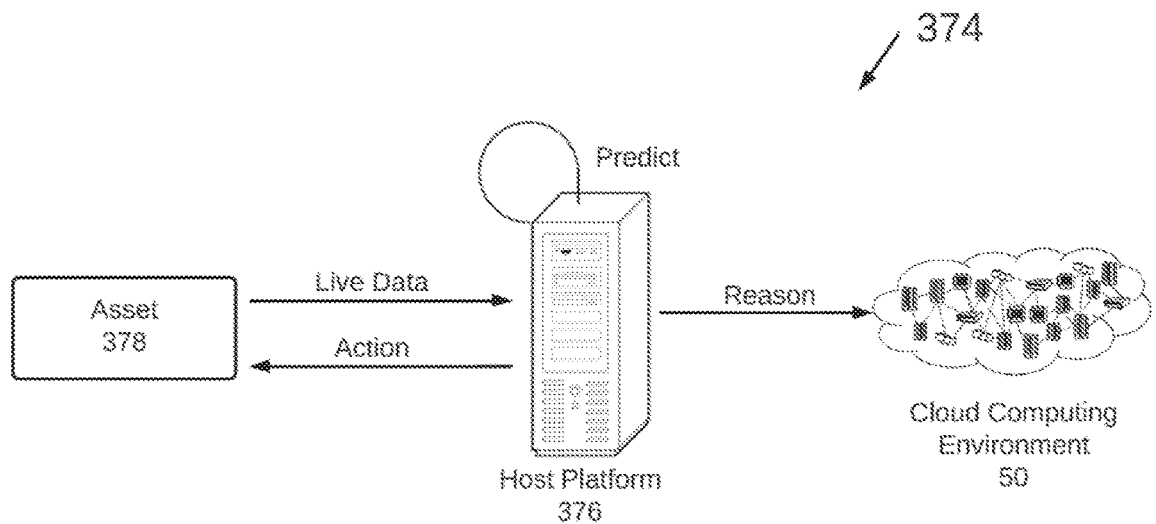
Figure 3E:
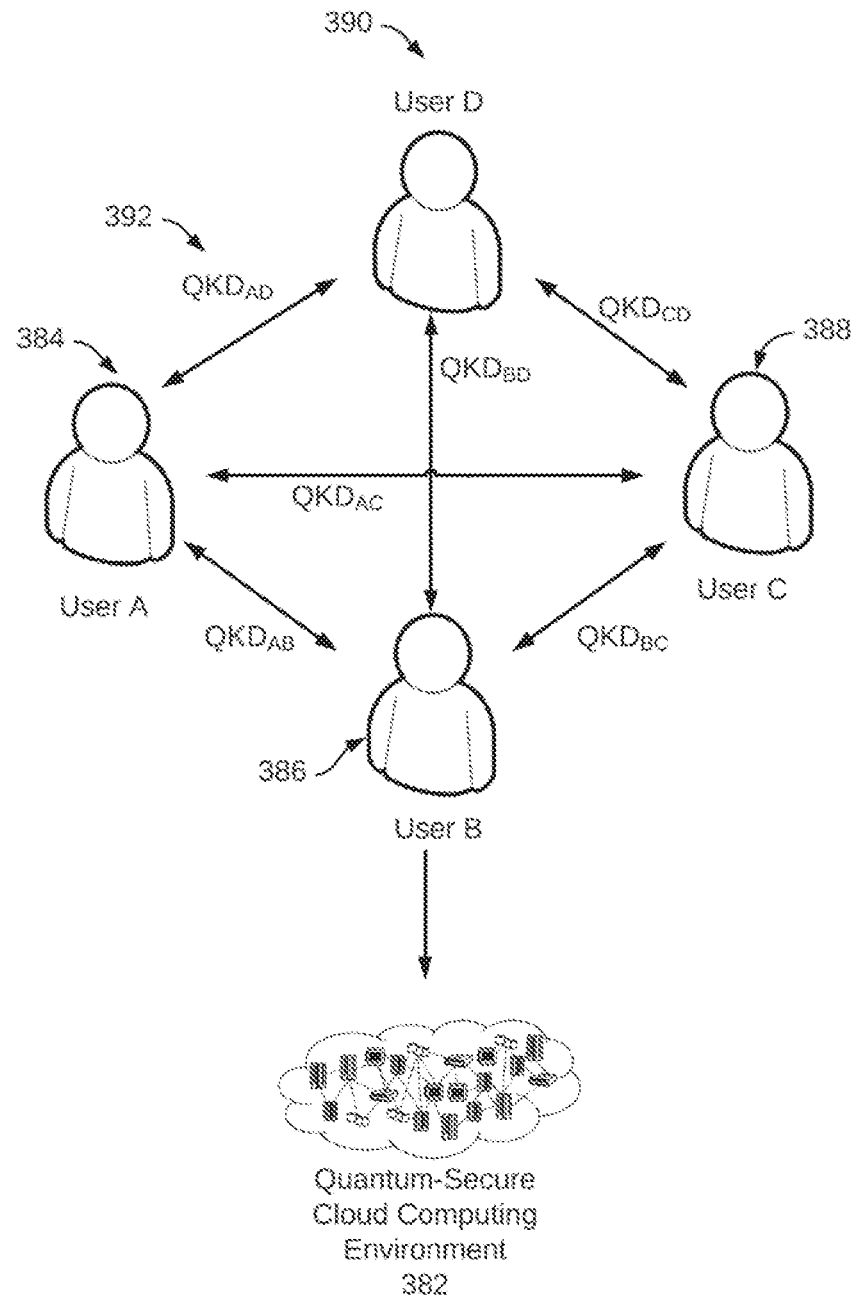
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 50 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376 builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 50 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 50. This can significantly reduce the collection time needed by the host platform 376 when performing predictive model training. For example, data can be directly and reliably transferred straight from its place of origin to the cloud computing environment 50. By using the cloud computing environment 50 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the data associated therewith) may be stored on the cloud computing environment 50 by the host platform 376. Each refinement of the machine learning model (e.g., changes in variables, weights, etc.) may be stored in the cloud computing environment 50 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 50.

After the model has been trained, it may be deployed to a live environment where it can make predictions/decisions based on the execution of the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by the execution of the machine learning model at the host platform 376 may be stored on the cloud computing environment 50 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 50. In one embodiment the features and/or the actions described and/or depicted herein can occur on or with respect to the cloud computing environment 50.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender, and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used including QKDAB, QKDAc, QKDAD, QKDBc, QKDBD, and QKDcD. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions, and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 384-390) authenticate the transaction by providing their shared secret key 392 (QKD). This quantum signature can be attached to every transaction making it exceedingly difficult to be tampered with. Each node checks its entries with respect to a local copy of the cloud computing environment 382 to verify that each transaction has sufficient funds.

FIGS. 4A-4D are diagrams illustrating a data error detection process within a data replication system such as a distributed data replication system. In this example, a source site (e.g., a source server, etc.) is attempting to transfer/synchronize its content to a backup copy of the source server at a target location (e.g., a target server, etc.) Both the source and the target may include agents installed therein according to various embodiments. In addition, intermediate servers along a transmission path between the source server and the target server may include agents as well. Each of the agents may communicate with a coordinator that is hosted by a cloud platform, one of the sites, or the like.

Figure 4A:
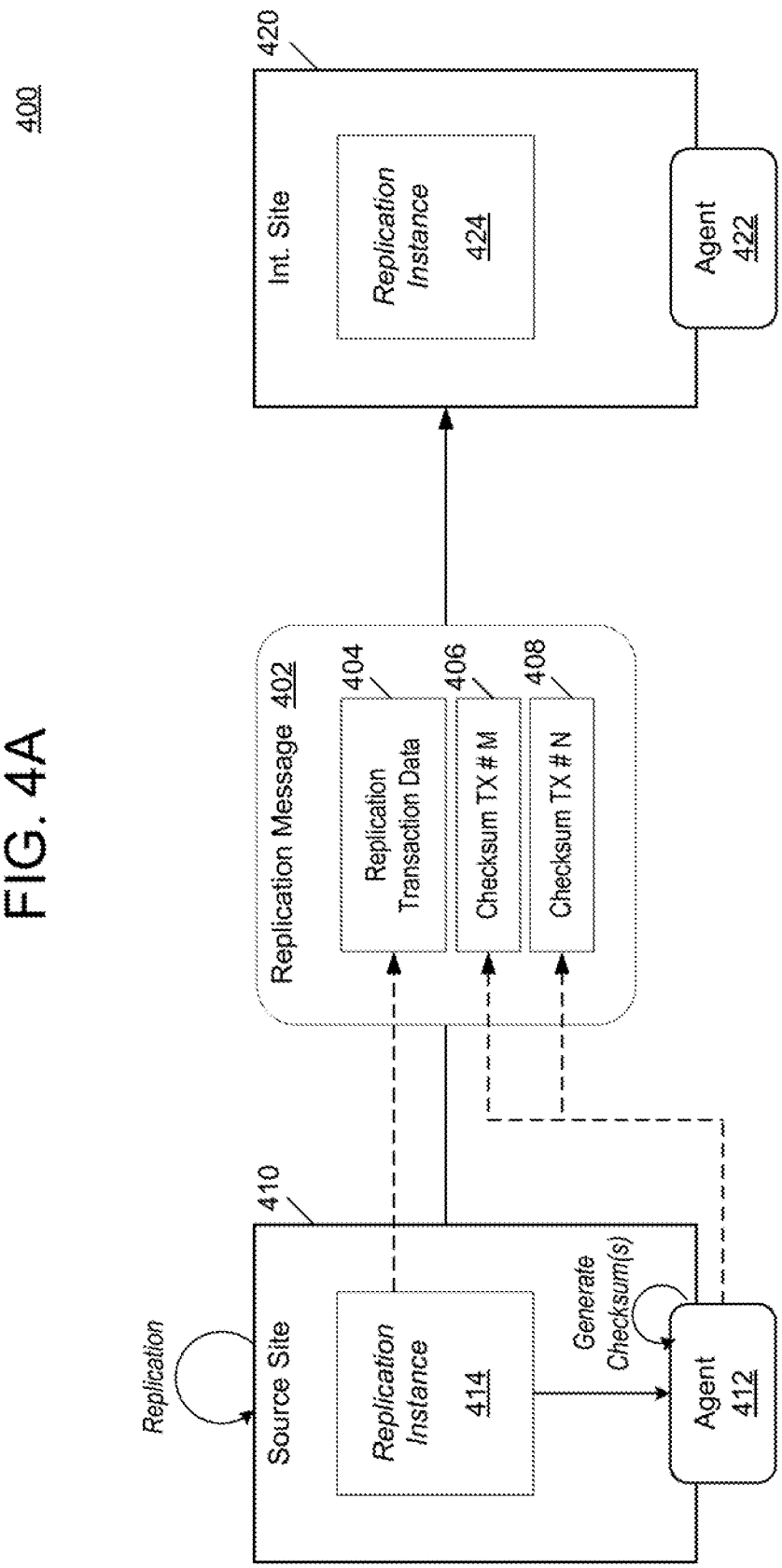
FIG. 4A is a diagram illustrating a process of transmitting a replication message between data replication sites according to an example embodiment.

FIG. 4A illustrates a process 400 of transmitting a replication message between data replication sites according to an example embodiment. Referring to FIG. 4A, a source site 410 is backing up data to a destination site (not shown). The transmission path for the transfer of data from the source site 410 to the destination site includes an intermediate site 420. It may also include multiple intermediate sites (not shown). In this example, the source site includes an agent 412 according to various embodiments and a replication instance 414 preparing a workload for replicating. The workload may include operations to be performed such as new data values to add, existing data values to modify, existing data values to delete, and the like. Here, the replication instance 414 may generate a replication message 402 with replication data 404 for transfer to the destination site.

In this example, the agent 412 (e.g., plugged in or otherwise installed on a server at the source site 410) may generate and inject one or more checksums into the replication message 402. For example, the agent 412 may generate a checksum (e.g., a hash value, etc.) of a first transaction (e.g., transaction A) and add it to a transaction message for a second transaction (e.g., transaction B) and a transaction message for a third transaction (e.g., transaction C). The combination of the checksum of transaction A, transaction message B with checksum A added, and transaction message C with checksum A added may be sent to the next agent/server (i.e., agent 422 at intermediate site 420.) The replication operation may include dozens or even hundreds of transactions (e.g., database transactions, etc.) to be performed in order to synchronize the target site with the source site 410. Here, the agent 412 may select transactions at random, and then generate the checksums of the transactions selected randomly. As another example, the agent 412 may select predefined transactions and use them for checksums. The replication message 402 is then forward to an intermediate site 420 which also includes an agent 422 installed therein. The agent 422 installed at the next server may generate a checksum for transaction A and compare it to the checksum value of A stored within the transaction message B or the transaction message C. Which transaction message is chosen can be random? The coordinator may request the corresponding agents to do checksum revaluation before/after reaching the latency threshold, so that it could reduce the false alarm caused by latency. The coordinator may not ask the replication server to resend the data replication messages, instead, it will notify the user to take actions on data loss.

That is, an agent may be plugged into a source server, a target destination server, and intermediate servers. The agent at the source server may inject additional checksum values into the replication transaction data message. Furthermore, the agents at the intermediate servers may validate the checksum and send suspicion message to a coordinator (FIG. 4C) if there is a mismatch. An agent may also be installed in the target destination server and perform the same role as the agents plugged into the intermediate servers.

Referring again to the example in FIG. 4A, the agent 412 installed at the source site 410 (source server) may collect replication transaction messages before they are sent by the replication instance 414 and add the checksum values to the message before it is sent. The implementation of replication transaction messages could be different from different replication product provider. As an example, the messages may be in XML format. In this case, the checksum could be stored anywhere in the XML format with correct schema. In other words, as long as the message could be correctly interpreted by the next server and existing replication server, it could be anywhere in the message.

Figure 4B:
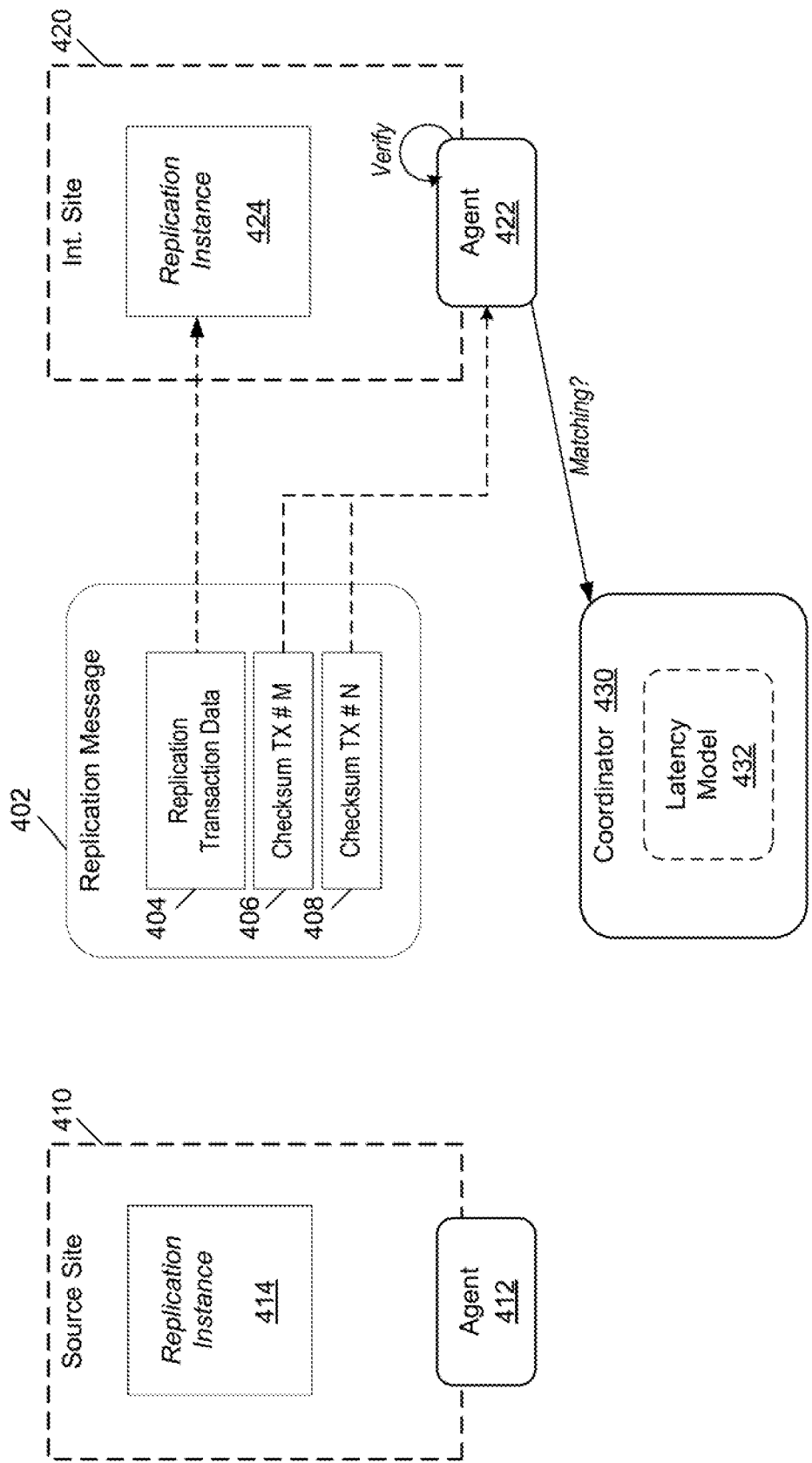
FIG. 4B is a diagram illustrating a process of verifying a status of a data replication operation based on a checksum validation according to an example embodiment.

FIG. 4B illustrates a process 440 of verifying a status of a data replication operation based on a checksum validation according to an example embodiment. Referring to FIG. 4B, the replication message 402 is received by the intermediate site 420. In response, the replication instance 424 may forward the replication message 402 to an agent 422 installed locally on the intermediate site 420 (server). The agent 422 may identify which transactions within the replication transaction data 404 are used to create the checksum values 406 and 408, based on transaction IDs in the data replication message 402, and re-create the checksum values based on the replication transaction data 404.

Next, the agent 422 may compare the re-created checksum values to the checksum values 406 and 408 in the replication message 402 to determine if they are a match. If both match, then the agent 422 determines no data loss exists. If they do not match, there is a chance data could be lost. The result of the determination may be transmitted from the agent 422 to a coordinator 430 which is hosted on a central platform. Here, the agent 422 may specify that the checksums match (success) or that the checksums do not match (suspicious).

Figure 4C:
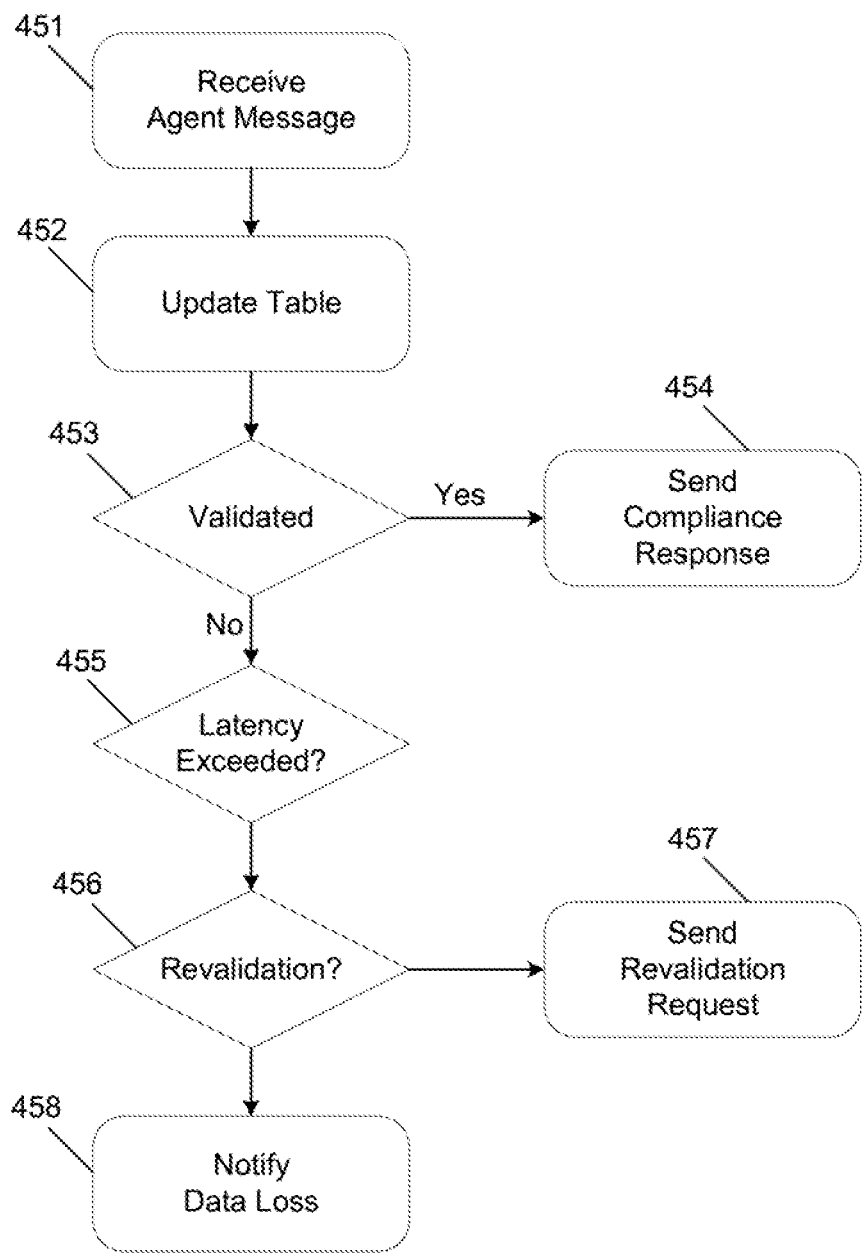
FIG. 4C is a diagram illustrating a process of determining whether a data loss has occurred according to an example embodiment.

FIG. 4C illustrates a process 450 of determining whether a data loss has occurred according to an example embodiment. The process 450 may be performed by the coordinator 430 shown in FIG. 4B. Referring to FIG. 4C, in 451, the coordinator may receive a checksum validation message from an agent (e.g., the agent 422 in FIG. 4Bm, etc.) The checksum validation message may include an identifier of the agent (e.g., an agent ID, etc.) which is unique to the agent among the network of agents. Also, the validation message may include a status identifier of the checksum validation (e.g., pass/fail, etc.) In addition, the validation message may include an identifier of the transactions used to generate the checksums.

Figure 4D:
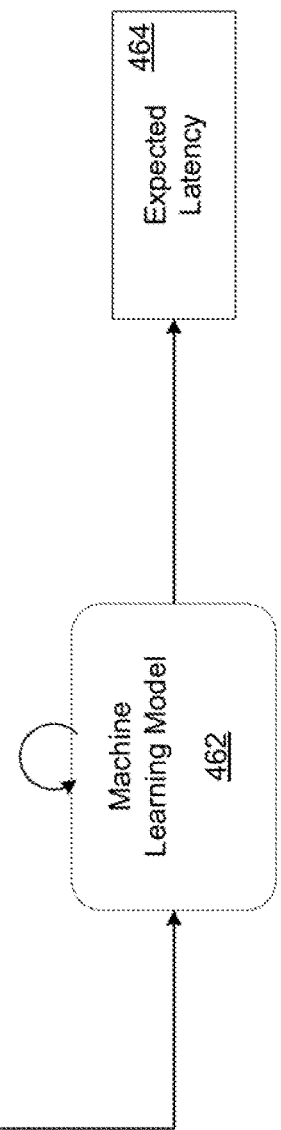
FIG. 4D is a diagram illustrating a process of training a latency model according to an example embodiment.

In 452, the coordinator may add an entry to a tracking table (e.g., tracking table 470 shown in FIG. 4D, etc.) Each agent validation may include its own entry in the tracking table 470. For example, if a replication message passes through three intermediate sites (and agents installed therein), the coordinator 430 will receive three validations of the replication data included in the replication message from the three agents. Each validation message and the attributes therein may be added to an entry in the tracking table 470. In 453, the coordinator may determine whether the message received in 451 indicates a successful validation (i.e., the checksum created by the agent matches the checksum in the message) or an unsuccessful validation (i.e., the checksums do not match). If the checksum validation is successful, in 454, the coordinator may send a notification of compliance to one or more administrators of the replication operation.

However, if the checksum validation is not successful, in 455, the coordinator may determine whether a latency value has been exceeded. The latency value may be a range of time that can ensure that the unsuccessful validation is not due to a false alarm (i.e., network latency). Here, the coordinator may identify how much time has passed since the replication message was transmitted based on a timestamp of the replication message. The coordinator may compare the amount of time to the range of time in the latency value. If the amount of time is within the range of time created by the latency value, the coordinator may send a request to the source site 410 to resend one or more transactions to the intermediate site 420 which were not properly received.

Referring again to FIG. 4D, the latency value may be a range of time (e.g., 300 seconds, 1000 seconds, etc.) which represents an acceptable amount of latency. The latency value may be determined may a machine learning model 462 shown in FIG. 4D. The machine learning model 462 may receive, as input, the tracking table 470 and analyze the history of the replication operations/communications performed by the source site 410 to determine a latency value 464 of possible latency with the source site 410. The latency value 464 can be used by the coordinator when determining whether there is a data loss in 456. For example, if the latency value has not been exceeded, in 456 the coordinator may determine to request a resend since it is possible the data did not arrive due to latency (and will eventually arrive). Furthermore, in 457, the coordinator may send the request to resend to the source site. However, the if the latency value has been exceeded, in 456 the coordinator may detect a data loss, and in 458, the coordinator may send a notification to a computing system associated with the data replication such as an administrator, or the like. Also, the coordinator may instruct the source site 410 to resend the missing data.

FIG. 5 illustrates a method 500 of simulating a workflow based on a simulated workflow environment according to an example embodiment. For example, the method 500 may be performed by a computer system such as a cloud platform, a web server, a personal computer or other user device, and the like. Referring to FIG. 5, in 510 the method may include receiving a message from an agent installed at a data replication server. Here, the message may include a status identifier of a checksum validation of a data replication operation.

In 520, the method may include identifying a latency value associated with the data replication server. For example, the latency value may be determined by analyzing a log/summary of historical messages from the agent installed on the data replication server. Here, the host may detect an amount of latency that is acceptable (not an error) in a particular situation under particular conditions and use this latency value to determine whether a checksum validation could be incomplete because all data has not yet arrived. In 530, the method may include determining whether a data loss has occurred based on the status identifier of the checksum validation and the latency value. In 540, in response to a determination that the data loss has occurred, the method may include transmitting a notification of the data loss to a computing system associated with the data replication server.

In some embodiments, the message may further include an agent identifier of the agent installed at the data replication server and an identifier of a transaction within the data replication operation. In some embodiments, the method may further include receiving a plurality of messages from the agent installed on the data replication server during the data replication operation, and generating a tracing table with identifiers of a plurality of transactions included in the data replication operation and status identifiers of checksum validations of the plurality of transactions, respectively, included in the plurality of messages. In some embodiments, the method may further include executing a machine learning model on the generated tracing table to predict the latency value. In some embodiments, the method may further include receiving a request for status of the data replication operation and displaying content from the tracing table via a user interface in response to the request.

In some embodiments, the method may further include determining to request re-validation of a transaction included in the data replication operation based on a number of occurrences of requests for re-validation already performed. In some embodiments, the method may further include receiving status identifiers of checksum validations of the data replication operation from a plurality of agents installed on a plurality of data replication servers included in the data replication operation, respectively. In some embodiments, the method may further include identifying a transaction that was not successfully received based on the determination and transmitting a control signal to a source data replication server to re-send the transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
a processor configured to
receive a plurality of messages from an agent installed on a data replication server during a data replication operation, wherein each message comprises status identifiers of the data replication operation,
generate a table that includes identifiers of a plurality of transactions included in the data replication operation and the status identifiers of checksum validations of the plurality of transactions, respectively, included in the plurality of messages,
identify a latency value associated with the data replication server based on execution of a machine learning model on the status identifiers included in the table;
determine whether a data loss has occurred based on the latency value; and
in response to a determination that the data loss has occurred, transmit a notification of the data loss to a computing system associated with the data replication server via a network interface.

2. The apparatus of claim 1, wherein each message further comprises an agent identifier of the agent that transmitted the respective message.

3. The apparatus of claim 1, wherein the processor is further configured to receive a request for status of the data replication operation and display content from the table via a user interface in response to the request.

4. The apparatus of claim 1, wherein the processor is further configured to determine to request re-validation of a transaction included in the data replication operation based on a number of occurrences of requests for re-validation already performed.

5. The apparatus of claim 1, wherein the processor is configured to receive status identifiers of checksum validations of the data replication operation from a plurality of agents installed on a plurality of data replication servers included in the data replication operation, respectively.

6. The apparatus of claim 1, wherein the processor is further configured to identify a transaction that was not successfully received based on the determination that the data loss has occurred and transmit a control signal to a source data replication server to re-send the transaction.

7. A method comprising:
receiving a plurality of messages from an agent installed on a data replication server during a data replication operation, wherein each message comprises status identifiers of the data replication operation;
generating a table that includes identifiers of a plurality of transactions included in the data replication operation and status identifiers of checksum validations of the plurality of transactions, respectively, included in the plurality of messages;
identifying a latency value associated with the data replication server based on execution of a machine learning model on the status identifiers included in the table;
determining whether a data loss has occurred based on the latency value; and
in response to a determination that the data loss has occurred, transmitting a notification of the data loss to a computing system associated with the data replication server.

8. The method of claim 7, wherein each message further comprises an agent identifier of the agent that transmitted the respective message.

9. The method of claim 7, wherein the method further comprises receiving a request for status of the data replication operation and displaying content from the table via a user interface in response to the request.

10. The method of claim 7, wherein the method further comprises determining to request re-validation of a transaction included in the data replication operation based on a number of occurrences of requests for re-validation already performed.

11. The method of claim 7, wherein the method further comprises receiving status identifiers of checksum validations of the data replication operation from a plurality of agents installed on a plurality of data replication servers included in the data replication operation, respectively.

12. The method of claim 7, wherein the method further identifying a transaction that was not successfully received based on the determination that the data loss has occurred and transmitting a control signal to a source data replication server to re-send the transaction.

13. A computer-readable storage medium comprising instructions, that when read by a processor, cause the processor to perform a method comprising:
receiving a plurality of messages from an agent installed on a data replication server during a data replication operation, wherein each message comprises status identifiers of the data replication operation;
generating a table that includes identifiers of a plurality of transactions included in the data replication operation and status identifiers of checksum validations of the plurality of transactions, respectively, included in the plurality of messages;
identifying a latency value associated with the data replication server based on execution of a machine learning model on the status identifiers included in the table;
determining whether a data loss has occurred based on the latency value; and
in response to a determination that the data loss has occurred, transmitting a notification of the data loss to a computing system associated with the data replication server.

14. The computer-readable medium of claim 13, wherein each message further comprises an agent identifier of the agent that transmitted the respective message.

15. The computer-readable medium of claim 13, wherein method further comprises determining to request re-validation of a transaction included in the data replication operation based on a number of occurrences of requests for re-validation already performed.

16. The computer-readable medium of claim 13, wherein the method further comprises identifying a transaction that was not successfully received based on the determination that the data loss has occurred and transmitting a control signal to a source data replication server to re-send the transaction.

* * * * *